April 1, 1930.  W. B. GERBRACHT  1,752,554

TAKE-OFF AND LANDING DEVICE FOR AEROPLANES

Filed Aug. 23, 1927

INVENTOR
Wilford B. Gerbracht
BY
ATTORNEY

Patented Apr. 1, 1930

1,752,554

UNITED STATES PATENT OFFICE

WILFORD B. GERBRACHT, OF AMES, IOWA

TAKE-OFF AND LANDING DEVICE FOR AEROPLANES

Application filed August 23, 1927. Serial No. 214,852.

This invention relates generally to flying machines and has more particular reference to a take off and landing device for airplanes.

The invention has for an object the provision of a take off and landing device for airplanes, which will enable high speed airplanes to have a quicker take off and a slower landing speed without decreasing the speed once the ship is in the air.

The invention has for a further object, the provision of a take off and landing device for airplanes, of simple, durable and reliable construction, which can be applied to airplanes at a reasonable cost.

For further comprehension of the invention, and of the objects and advantages thereof, reference will be had to the following description and accompanying drawing, and to the appended claim in which the various novel features of the invention are more particularly set forth.

Referring to the accompanying drawing, forming a material part of this disclosure:

Figure 1:
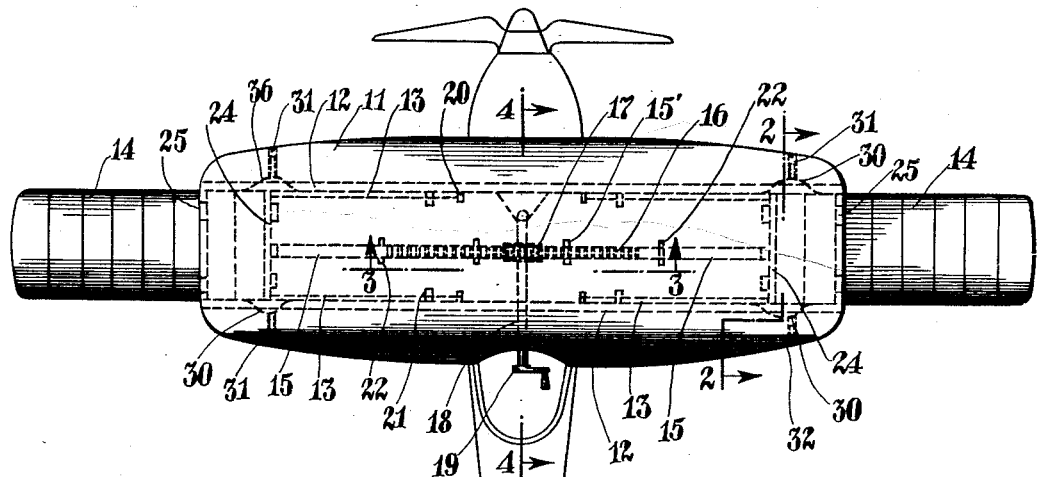
Fig. 1 is a plan view of an airplane constructed according to this invention.
Figure 2:
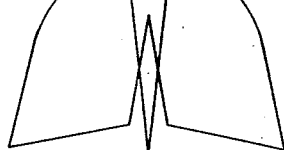
Fig. 2 is a vertical sectional view, taken on the line 2—2 of Fig. 1.

The reference numeral 10 indicates generally an airplane having a main wing 11 provided with longitudinally arranged spars 12. Guide members 13 are secured to the spars 12, and airfoils 14 are slidably connected to the guide members, so as to be contained in the wing, and slidable therefrom.

Connected to the inner sides of the airfoils 14 are bars 15 formed on one side with rack teeth 16 and running in guides 15' supported from wing 11. Pinion 17 is secured to shaft 18 and meshes with the rack teeth 16. The shaft is rotatably arranged in the wing and is fitted with crank 19 or other means of rotation at the will of the pilot.

The inner sides of the airfoils 14 are provided with stops 24 abutable against stops 25 on the wing 11, to prevent the airfoils from disengaging from the wings. The rack bars 15 are also provided with stops 22 coactable with the guides 15' which act as stops so that the airfoils are not forced further out or further in than their normal outer and inner positions.

Fig. 1 shows the airfoils about two-thirds extended. The airfoils are in fully extended positions when stops 22 and 15' engage, and in complete inner position when the outer edges of the airfoils are flush with the edges of the wings.

Figure 3:
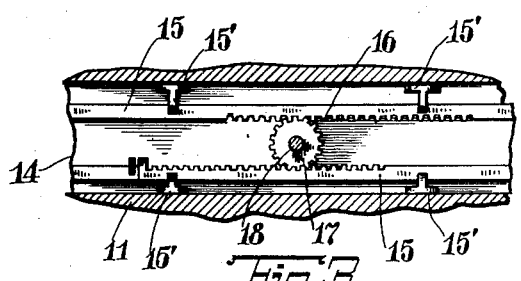
Fig. 3 is a fragmentary vertical sectional view, taken on the line 3—3 of Fig. 1.
Figure 4:
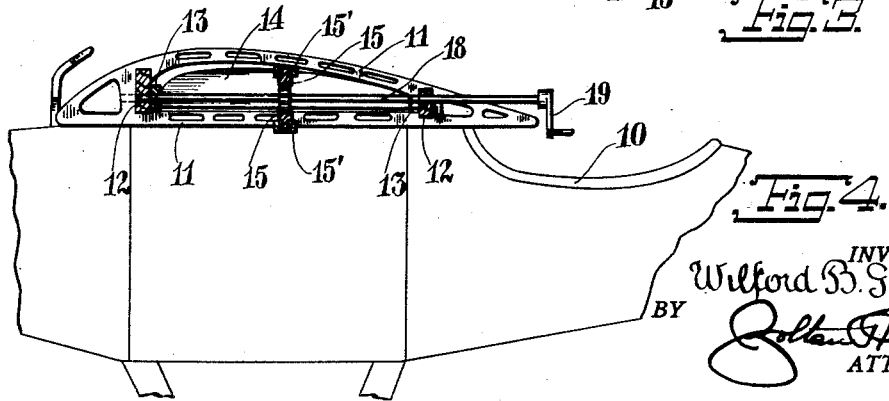
Fig. 4 is a vertical sectional view, taken along the line 4—4 of Fig. 1.

The operation of the device consists in the pilot moving crank 19 causing shaft 18 to rotate and this rotation is transmitted to pinion 17 causing bars 15 to move outwards thus moving airfoils 14 outwards. The pilot then starts the airplane, and the extended airfoils supplies extra wing area necessary for a quick take-off. The pilot then moves the crank 19 to rotate shaft 18 clockwise, as seen in Fig. 3, and the airfoils move to their inner positions, reducing the "head on" resistance of the plane when in flight. When the plane is ready to land the airfoils are again extended giving the extra wing area necessary for slow landing speeds. Springs 30 may be tensioned by screws 31 threadedly engaged in wing 11, and act to friction the slidability of airfoils 14, so that they may not move, unless moved by the manipulation of crank 19. These springs bear against the rear of the guides 13, and determine the amount of friction between the guides and airfoils, the guides 13 being slightly movably secured to the spars 12.

It should be understood that by reason of the rigid attachment of the bars 15 to the airfoils 14 and the close fitting relation of the bars 15 to the guide members 15' the inner ends of the airfoils are rigidly restrained from movement and the distribution of the guide members 15' throughout substantially the length of the wing proper results in a corresponding distribution of the force required to resist counter clock wise rotation of the inner ends of the airfoils 14, when the airplane is in forward motion. This arrangement is particularly advantageous when the airfoils are in completely extended position and but a small portion of the length of their sides is in contact with the side guide strips 13.

While I have illustrated and described my invention with some degree of particularity, I realize that in practice various alterations therein may be made, I therefore reserve the right and privilege of changing the form of the details of construction or otherwise altering the relation of the correlated parts without departing from the spirit or the scope of the appended claim.

Having thus described my invention, what I claim as new and desire to secure by United States Letters Patent is:

In an airplane, a main wing having transversely disposed spars, said wing having an aperture extending transversely therethrough between said spars, guide members extending transversely of said wing and located at the front and rear ends of the aperture in said wing and secured to said spars so as to have a slight transverse horizontal movement with respect thereto, air foils disposed within the aperture in the wing at the ends of the wing and slidably supported by said guide members for movement longitudinally of said wing, a rack secured to one of said foils and having downwardly disposed rack teeth, a second rack secured to the other of said foils and having upwardly disposed rack teeth, said racks being in vertical alignment and being disposed in the upper and lower portions respectively of said apertures and extending inwardly to the center of said wing, a pinion disposed midway between said rack bars and engaging the teeth of both of them for simultaneously extending and retracting said air foils, and springs mounted on said spars and pressing said guide members against said foils so as to hold said foils in position by friction.

In testimony whereof I have affixed my signature.

WILFORD B. GERBRACHT.